Aug. 23, 1927.  1,640,199
J. I. LOGAN
FLOUR MATURING METHOD AND APPARATUS
Filed Aug. 3, 1925
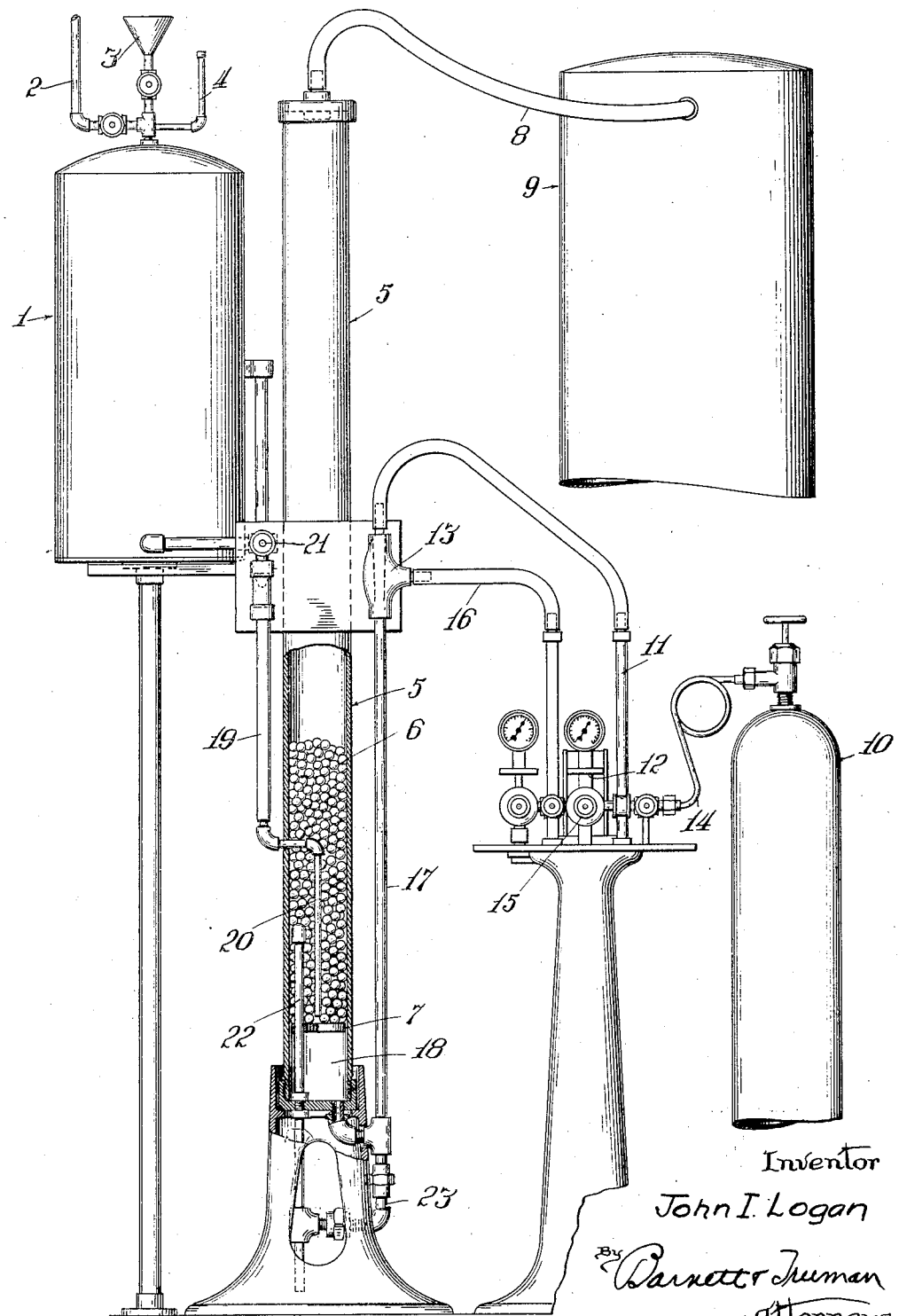
Inventor
John I. Logan Patented Aug. 23, 1927.

1,640,199

UNITED STATES PATENT OFFICE.

JOHN I. LOGAN, OF CHICAGO, ILLINOIS, ASSIGNOR TO INDUSTRIAL APPLIANCE COMPANY, OF CHICAGO, ILLINOIS, A CORPORATION OF WEST VIRGINIA.

FLOUR-MATURING METHOD AND APPARATUS.

Application filed August 3, 1925. Serial No. 47,793.

My invention relates to the maturing of flour, or like cereal products by treatment with gaseous agents.

It is well known that wheat flour, for example, undergoes certain changes with a lapse of time which improve its baking qualities and give it a whiter color. It is now quite universally accepted by the authorities in cereal chemistry, that the most important change associated with the improved baking quality of aged flour, is its developed greater concentration of hydrogen ions, and that this effect can be simulated in the essential respects, at least, by treatment of the flour by certain gaseous agents. The acidity of the flour can be increased with the advantage to its baking qualities and its color also improved to some extent, by treatment with chlorine gas. The same increased acidity, with a greater improvement in the color, can be secured with chlorine gas to which nitrosyl chloride gas has been added.

It has also been proposed to treat flour with nitrogen trichloride to bleach or whiten the flour; but this treatment does not uniformly improve the baking qualities and in particular does not increase its hydrogen ion concentration. Moreover, this treatment has the disadvantage of increasing the tendency of the flour to deteriorate through enzymatic or bacterial action so as to become unsound or too highly acidified when kept for a long period of time.

The purpose of my present invention is to provide a method of maturing flour which, having regard to all the desirable objects to be attained, namely the optimum increase in the hydrogen ion concentration, improvement in the baking quality of the flour, increased whiteness and prevention of deterioration with lapse of time, will be superior to the maturing and bleaching methods heretofore used. The gaseous agent employed in accordance with my present invention, consists of the gas or mixture of gases formed by bringing chlorine and nitrosyl chloride gases into contact with aqua ammonia, with the chlorine and nitrosyl chloride in excess of the amount entering into reaction with the aqua ammonia.

This new gaseous treating agent may be formed by bringing chlorine gas preferably mixed with nitrosyl chloride for the reasons above stated and, diluted largely with air, into contact with a weak solution of ammonia, preferably by passing the chlorine gas mixed with nitrosyl chloride gas through the ammonium solution. Whatever may be the actual composition of the resulting gaseous agent with respect to its chemical constituents, it produces certain unexpected results on the flour, different from the results of treating flour, as has been done heretofore, either with nitrogen trichloride alone or with chlorine alone or mixed with nitrosyl chloride. In the first place the increased tendency exhibited by flour treated with nitrogen tri-chloride to deteriorate when stored, is entirely obviated and this serious disadvantage of the use of nitrogen trichloride, otherwise valuable for its whitening effect, is eliminated. The nitrogen trichloride when used alone does not increase the acidity of the flour but it apparently stimulates the micro-organisms or enzymes in the flour so that with the lapse of time, when the flour is stored there is developed too great an acidity, or other effect detrimental to the keeping and baking properties of the flour. In the use of the gaseous agent of my invention, it is not possible to state the exact chemical reactions which take place in its formation or to analyze fully its chemical composition, but in any case with the chlorine and nitrosyl chloride gases in excess of the amount combinable with the aqua ammonia, the activating effect above referred to is counteracted and the acidity of the flour is developed to the optimum hydrogen ion concentration for baking purposes and the natural processes leading to increased acidity arrested, with the result that the flour is stabilized, so that within reasonable limits of time its condition will remain unchanged.

The accompanying drawing shows in side elevation, with parts in section, an apparatus suitable for carrying out the method of the present invention.

So far as the method is concerned, however, the invention is not to be considered as limited to the employment of any particular form of apparatus, it being my intention to cover the method and apparatus and all modifications thereof within the scope of the hereto appended claims.

Referring to the drawing, 1 designates a tank adapted to contain a solution of ammonia, the tank being provided with a water feed pipe 2, a filling funnel 3 for the aqua ammonia and a vent pipe 4.

5 is a reaction tower preferably filled with balls 6 of glass or other material, supported on a perforated plate 7. 8 is a pipe for conducting the gaseous treating agent to the flour treating chamber 9, which latter may be of any preferred construction, no claim being made herein to the construction of the treating chamber, or so called agitator, or the means employed for showering the flour therethrough and for introducing the gas in a diffused state thereinto.

10 is a cylinder which contains liquified anhydrous chlorine and nitrosyl chloride and 11 an air pipe leading from a blower 12 to a mixing nozzle 13, to which the gas is conducted from cylinder 10 by pipe 14, control apparatus 15 and pipe 16. The control apparatus 15 may be of any suitable construction for delivering the gas from the cylinder to the mixing nozzle in accurately measured quantities per unit volume of air.

The mixture of air and gas is forced through a pipe 17 into the space 18 in tower 5 below the perforated plate 7. 19 is a pipe leading from the solution tank 1 to the tower, provided, preferably, with an extension 20 within the tower reaching to a point close to the perforated plate 7. Pipe 19 is provided with a valve 21 which may be set to control the flow of the solution from the vessel 1 to the tower 5.

Preferably the tower is provided with an overflow pipe 22, designed to maintain the solution in the tower at an appropriate level. 23 is a valved draw-off pipe for connecting pipe 17 with the lower portion of the outlet pipe 22.

The operation of the described apparatus is as follows: For treatment of 800 pounds of wheat flour I prefer to use one ounce of a mixture of chlorine and nitrosyl chloride gases, and two ounces of a two per cent ammonia solution (by weight).

The ammonia solution passes by gravity through pipe 19, 20, into the reaction tower 5. The chlorine and nitrosyl chloride gases, mixed with air, enter the bottom of the reaction tower and bubble up through the solution. The glass balls 6 or like objects bring about an intimate commingling of the gases and liquid, as a result of which there is produced a gaseous treating agent as above described, which is conducted through pipe 8 to the flour treating chamber where it is brought into contact with the flour dispersed through the chamber in the manner customary in the treatment of flour by gaseous agents. By "flour" as used in the claims and in the foregoing specification I intend to cover any cereal products finely enough divided to be susceptible of treatment in the manner just described.

I claim:

1. Apparatus for practicing the process herein described comprising in combination a reaction tower having an outlet for gas, a solution tank, a valved pipe leading from the solution tank to the reaction tower near the bottom of the latter, and means for forcing a mixture of air and gas into the bottom of the reaction tower.

2. Apparatus for practicing the process herein described comprising in combination a reaction tower having an outlet for gas, a plurality of solid bodies, arranged with voids between them in the lower portion of the reaction tower, a solution tank, a valved pipe leading from the solution tank to the reaction tower near the bottom of the latter, means for forcing a mixture of air and gas into the bottom of the reaction tower, and an overflow pipe in the reaction tower to maintain the liquid at an appropriate level.

3. Method of maturing flour which consists in continuously passing chlorine gas in contact with aqua ammonia, with the chlorine in excess of the amount which will combine with the ammonia, and bringing the resultant gaseous agent, diluted with an inert gas, into contact with the flour in a dispersed state.

4. Method of maturing flour which consists in continuously passing chlorine and nitrosyl chlorid gases in contact with aqua ammonia, with such gases in excess of the amount which will combine with the ammonia, and bringing the resultant gaseous agent, diluted with an inert gas, into contact with the flour in a dispersed state.

5. Method of maturing flour which consists in exposing the flour in a dispersed state to a gaseous agent containing the reaction products of chlorine and aqua ammonia.

6. Method of maturing flour which consists in exposing the flour in a dispersed state to a gaseous agent containing the reaction products of chlorine, nitrosyl chlorid and aqua ammonia.

7. Method of maturing flour which consists in causing chlorine gas and air under pressure to be passed in contact with dilute aqua ammonia in a divided state and bringing the resultant gaseous agent into contact with flour while suspended in an enclosed space.

8. Method of maturing flour which consists in causing chlorine and nitrosyl chlorid gases and air under pressure to be passed in contact with dilute aqua ammonia in a divided state and bringing the resultant gaseous agent into contact with flour while suspended in an enclosed space.

JOHN I. LOGAN.